Dec. 24, 1946.  J. P. LIPTAK  2,413,238
BENZOL SCRUBBER
Filed May 8, 1943  2 Sheets-Sheet 2

INVENTOR
JOHN P. LIPTAK,
by: John E. Jackson
his Attorney.

Patented Dec. 24, 1946

2,413,238

UNITED STATES PATENT OFFICE 2,413,238

BENZOL SCRUBBER

John P. Liptak, Maple Heights, Ohio, assignor to The American Steel and Wire Company of New Jersey, a corporation of New Jersey Application May 8, 1943, Serial No. 486,263

2 Claims. (Cl. 252—362)

This invention relates to a benzol scrubber and more particularly to a method and apparatus for eliminating the emulsion formed in the bottom of the scrubber. Coke oven gas entering at the bottom of the benzol scrubber is laden with water, naphthalene and benzol products, and as the gas passes vertically through the numerous baffles in the scrubber, it is sprayed with an absorbing oil which removes the benzol products, water and naphthalene from the gas. These products settle in the bottom portion of the scrubbers together with the water formed from the steam which is used to free the naphthalene which accumulates on the baffles or in the oil distribution lines. The mixture of the oil, water and naphthalene in the bottom of the scrubbers forms an emulsion which is difficult to handle and which cannot be drained because of line stoppages.

When pumped to the benzol department, the emulsion causes delays, loss of products and increases the operating cost. The oil and the emulsion going to the heat exchanger stops the feed and drain lines and causes a loss in heat transfer. In the preheater the emulsion causes stoppage of the drain lines and uneven temperatures of the oil leaving the preheater. This results in frequent shut-downs for cleaning and loss of benzol products.

It is an object of my invention to provide a method of eliminating the emulsion formed in the bottom of the benzol scrubber.

Another object is to provide suitable apparatus for carrying out the method of the invention.

These and other objects will be more apparent after referring to the following specification and attached drawings, in which.

Figure 1:
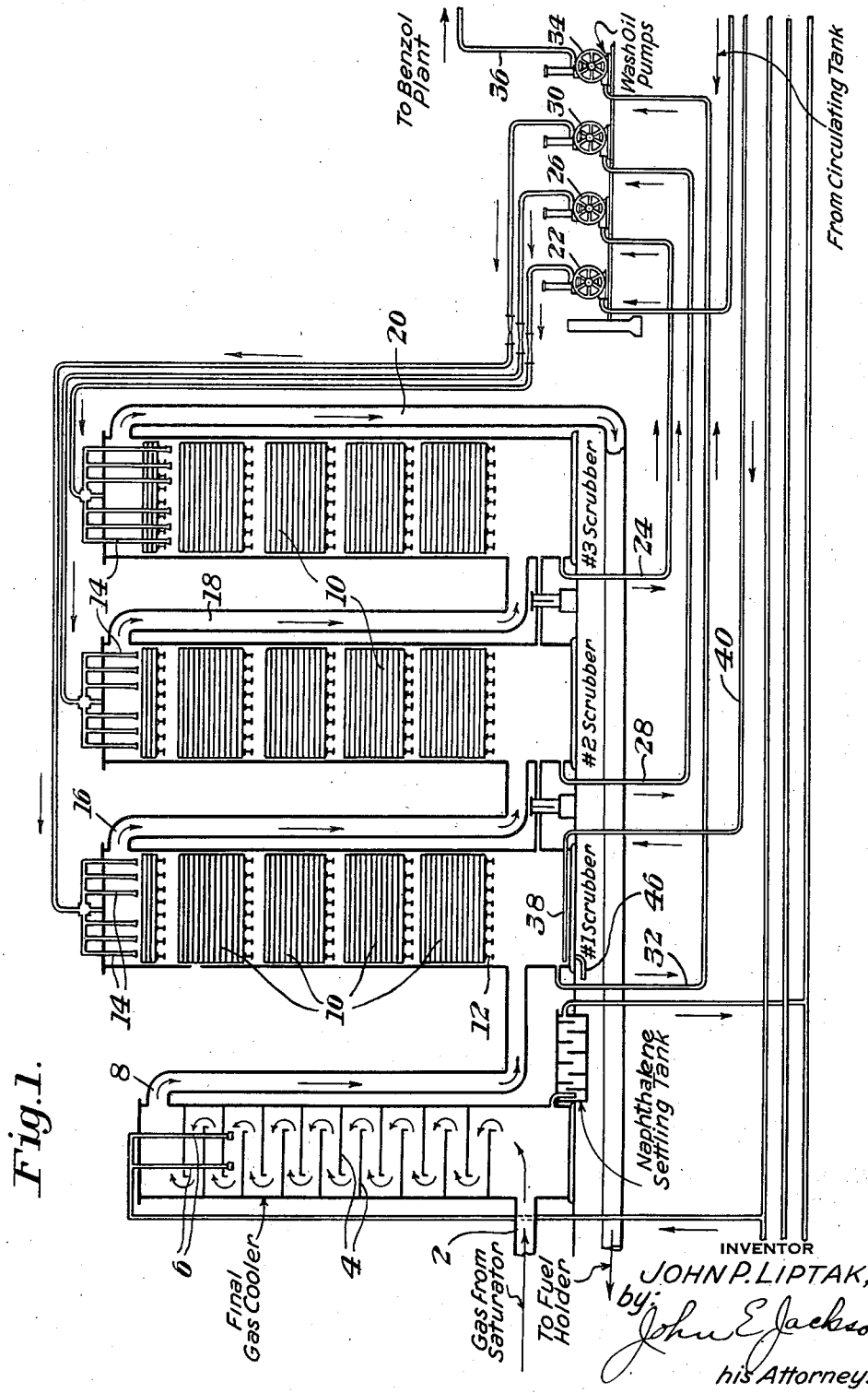
Fig. 1 is an elevation of the benzol scrubber.
Figure 2:
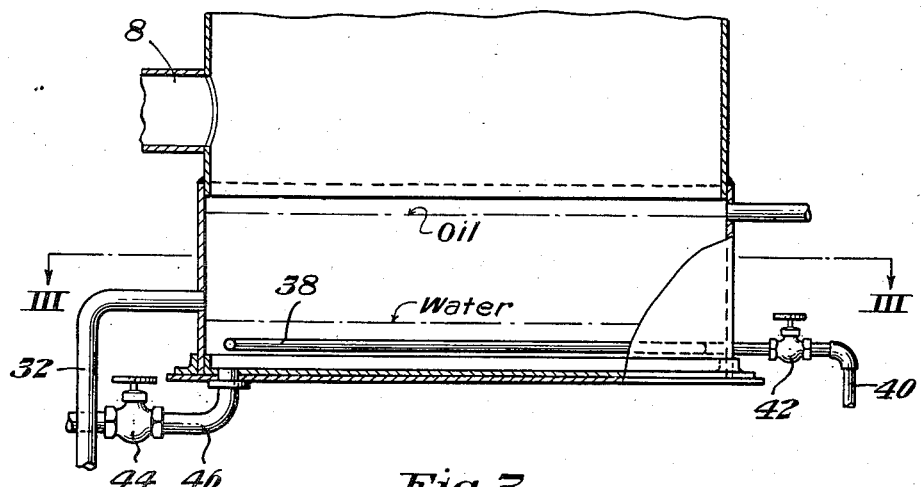
Fig. 2 is an enlarged view showing the lower portion of the No. 1 scrubber in cross-section.
Figure 3:
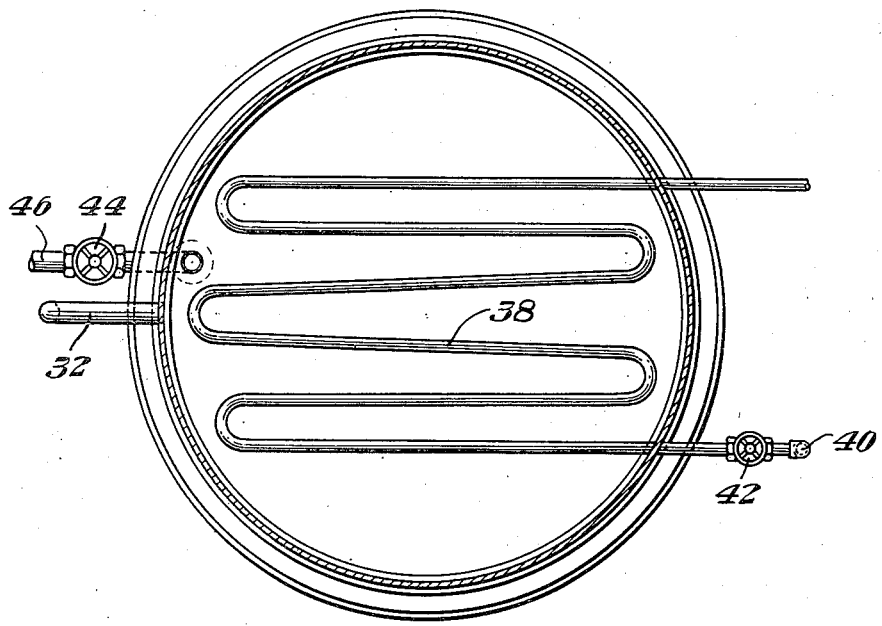
Fig. 3 is a section taken on the line III—III of Fig. 2.

Referring more particularly to the drawings, the reference numeral 2 indicates the gas inlet into the final gas cooler. The coke oven gas entering the final gas cooler is coming from the saturator where the ammonia has been removed from the gas. The gas enters at the bottom of the cooler and passes upwardly therethrough while following a tortuous path over baffles 4. Water from sprays 6 enters the cooler at its top and washes down over the baffles 4, thus cooling the gas by coming into direct contact therewith.

The gas leaves the top of the cooler at 8 and is directed downwardly into the bottom portion of the No. 1 scrubber where it passes upwardly through the baffles 10. These baffles are wooden planks arranged on their edges in tiers on top of each other in criss-cross design and are grouped into several tiers, each supported on I-beams 12. The wash oil enters the top part of the scrubber through sprays 14 and washes down over the baffles 10 and collects in the bottom of the washer. The gas leaves the No. 1 scrubber at the top and passes through the pipe 16 into the bottom of No. 2 scrubber. Here the operation of scrubbing the gas with wash oil is repeated and the gas passes out of the No. 2 scrubber at the top and through pipe 18 to the bottom of No. 3 scrubber where the operation of scrubbing the gas with wash oil is completed. From the No. 3 scrubber the gas passes through pipe 20 to a conventional fuel gas holder or is by-passed for direct use as fuel in the plant.

The wash oil coming from the circulating tank (not shown) is pumped by means of pump 22 into the top of No. 3 scrubber. As it passes through the baffles 10, the wash oil absorbs the benzol products from the gas. From the bottom of No. 3 scrubber the wash oil containing benzol products pass through pipe 24 to pump 26 which pumps the wash oil into the top of No. 2 scrubber. As the oil passes down through the baffles 10, it absorbs more benzol products from the gas and passes out of the bottom of the scrubber into the pipe 28 leading to pump 30 which pumps the oil into the top of No. 1 scrubber. As the oil passes down through the baffles of the No. 1 scrubber, it absorbs additional benzol products from the gas and passes out of the bottom of the scrubber into pipe 32 leading to pump 34. At this time the oil has become saturated with benzol products, and it is necessary to separate the benzol products from the oil. This is done by pumping the oil through pipe 36 to conventional heat exchangers, preheaters, wash oil still and finally to the wash oil circulating tank. The oil is then ready to be recirculated through the system.

Water, naphthalene and benzol products are contained in the gas which enters the scrubbers. Water is carried over from the final cooler and additional water enters the scrubbers in the form of steam which is used daily to clean out the sprays 14. The water, together with the naphthalene and wash oil, forms an emulsion which builds up on the baffles and collects in the bottom portion of the scrubber. As time goes on the emulsion builds up, thus causing line stoppages in the wash oil pipe lines and also in the benzol plant. The benzol plant has many delays due to the emulsion collecting in the system, thus causing loss of products and higher operating cost. The usual way of ridding the lines of the emulsion is to close them off and pass steam therethrough. It is almost impossible to remove the emulsion from the bottom of the scrubber without dismantling the bottom section and digging the emulsion out. The concentration of the emulsion is greatest in the No. 1 scrubber.

It was found that when a steam coil carrying super-heated steam was installed on the extreme bottom of the No. 1 scrubber, the emulsion formation was practically eliminated, the efficiency of the system increased and the loss of wash oil decreased. Steam is supplied to the steam coil 38 in the bottom of the scrubber through steam line 40. The supply of steam is controlled by means of valve 42. When the globs of emulsion come into contact with the steam coil, the emulsion breaks down into oil and water and the oil floats on the water. The valve 44 is opened periodically and the water drained from the scrubber through line 46. The wash oil passes out of the scrubber through pipe 32.

While one embodiment of the invention has been shown and described, it will be apparent that other modifications and adaptations may be made without departing from the scope of the attached claims.

I claim:

1. A benzol scrubber having an emulsion of wash oil and water formed in the bottom portion thereof which comprises means for introducing wash oil into the top of the scrubber, means for introducing gas into the lower part of the scrubber, means below the last named means for providing heat to break down the emulsion into oil and water, means for draining the water from the bottom of the scrubber, and means between the last named means and the gas introducing means for draining the oil from the scrubber, said oil draining means being above the heating means.

2. A benzol scrubber having an emulsion of wash oil and water formed in the bottom portion thereof which comprises means for introducing wash oil into the top of the scrubber, means for introducting gas into the lower part of the scrubber, a steam coil in the bottom portion of the scrubber below the last named means for providing heat to break down the emulsion into oil and water, a drain line for removing the water from the bottom of the scrubber, and a second drain line below said gas introducing means and above said coil and said first named drain line for removing the oil from the scrubber.

JOHN P. LIPTAK.